(No Model.)
T. McGUIRE.
CURTAIN FIXTURE.
No. 343,483. Patented June 8, 1886.
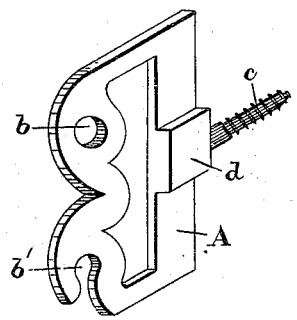
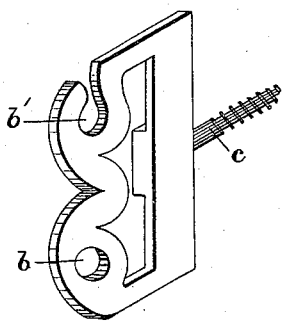
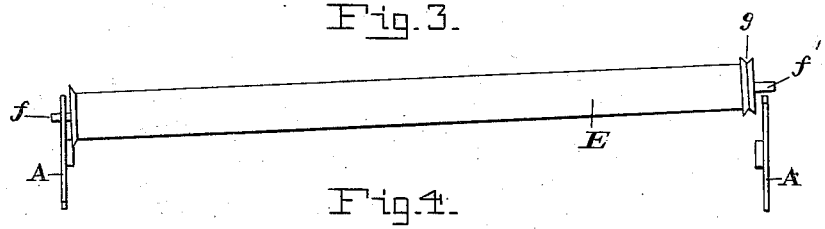
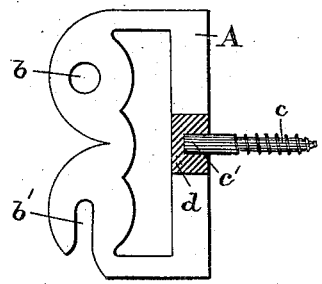
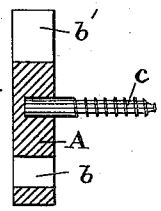
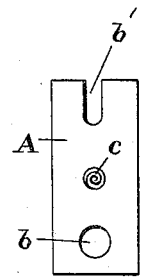
Witnesses:
A. E. Eader
John E. Morris.
Inventor:
Thos. McGuire
By Chas. B. Mann.
Attorney

UNITED STATES PATENT OFFICE.

THOMAS McGUIRE, OF BALTIMORE, MARYLAND.

CURTAIN-FIXTURE.

SPECIFICATION forming part of Letters Patent No. 343,483, dated June 8, 1886.

Application filed February 23, 1886. Serial No. 192,763. (No model.)

*To all whom it may concern:*

Be it known that I, THOMAS MCGUIRE, a citizen of the United States, residing at Baltimore, in the State of Maryland, have invented certain new and useful Improvements in Curtain-Fixtures, of which the following is a specification.

My invention relates to an improved bracket for the support of curtain-rollers, and is illustrated in the accompanying drawings, in which—

Figures 1 and 2 are views of the bracket in reversed positions, showing that one and the same bracket may by being turned upside down be used either on the right or left of a window. Fig. 3 is a view of a curtain-roller showing its application to two brackets. Fig. 4 is a side view of a bracket in which the screw-socket is shown in section. Figs. 5 and 6 are sectional and side views, respectively, of a modified form of bracket.

The body A of the bracket is made of cast metal, and has two bearings for the journal of the curtain-roller. One of these bearings has the shape of an eye or round hole, $b$, and the other a slot, $b'$, which opens on the side opposite the eye-bearing, and a screw, $c$, is secured at one edge of the bracket on a line exactly midway between the said two journal-bearings. The screw $c$ projects at a right angle from the edge of the bracket, and its head $c'$ is embedded in a socket, $d$, on the bracket. By this construction the screw $c$, which serves for the attachment of the bracket to the window-frame, serves also as a pivot for reversing the bracket, whereby to bring uppermost the particular bearing ($b$ or $b'$) that may be desired.

Curtain-rollers are ordinarily supported on two brackets, which are unlike. One of the two usually has an eye or round hole bearing, while the other one usually has a bearing with an open slot at its upper side. With brackets of this kind the curtain-roller is placed in position by first inserting the journal at one end in the eye-bearing bracket, and then dropping the journal at the other end in the slot-bearing bracket. Thus in this case a special bracket is used for each end of the curtain-roller, and this devolves on the manufacturer when putting them up, and the dealer when selling them, the necessity of providing for each pair two brackets which are unlike.

It will be seen my bracket has the two kind of bearings, an eye-bearing and a slot-bearing, and is suited for either end of the roller by merely reversing or turning it upside down on its pivot $c$. By this construction, therefore, a pair comprises two brackets of exactly the same kind, which makes the bracket more convenient for the manufacturer, dealer, and the housekeeper who uses it.

A curtain roller, E, has at each end a journal, and one of these journals, $f$, is ordinarily held down to its bearing on the bracket by means of the endless cord which passes over the grooved pulley $g$ at said end. The journal at this end, therefore, is placed in that bracket which has a slotted bearing. The other journal, $f'$, is held by entering that bracket which has an eye or round-hole bearing. By this construction the brackets to support the two ends of the roller are both alike, and the necessity for right and left hand brackets is avoided, and they may be readily secured to a window-frame without a screw-driver or other tool.

The form of bracket shown in Figs. 5 and 6 is for the support of curtains which are to hang close to the window-sash, especially in those cases where inside shutters are used. This bracket will suit for ordinary curtains, which are raised and lowered by a cord, or for spring-roller curtains.

Having described my invention, I claim—

A bracket for the support of curtain-rollers, provided with two journal-bearings—one, $b$, having the shape of an eye or round hole, and the other, $b'$, having the shape of a slot which opens at the sides opposite or most remote from said eye or round hole—and a screw, $c$, secured to the bracket exactly midway between the said two journal-bearings and projecting at a right angle, whereby the screw which attaches the bracket to the window-frame serves also as a pivot to bring uppermost either of said bearings, as set forth.

In testimony whereof I affix my signature in presence of two witnesses.

THOMAS McGUIRE.

Witnesses:
JOHN E. MORRIS,
JNO. T. MADDOX.